3,054,706
BONDING OF PIECES OF LIGNO-
CELLULOSE MATERIAL
Siegfried Glaubert, Paris, France, assignor of one-half
to Max Henry Hoepli, New York, N.Y.
No Drawing. Filed May 21, 1958, Ser. No. 736,699
7 Claims. (Cl. 154—45.9)

The present invention relates to improvements in the chemical union of two or more ligno-cellulosic substances by means of resinous materials.

It is an object of this invention to improve the union which is produced under the aforesaid conditions.

It is a further object of this invention to improve the chemical union between ligno-cellulosic material and resinous material in fabricated products.

A further object of this invention is to improve physical characteristics of the products in the manner aforesaid.

This invention is of particular utility in creating a unique chemical union between a ligno-cellulosic material and a thermosetting resin in fabricated products. In conventional practice, wood and other ligno-cellulosic materials commonly are bonded together using thermosetting resins as a binder or adhesive. The ligno-cellulosic material may be in the form of shavings, chips, sawdust, wood cuttings or like subdivided particles. Similarly, sheets or slabs of wood can be bonded together in the manufacture of products such as plywood, veneers and laminations. In the manufacture of such products the resin binder is applied in dry form or in the form of a water or alcohol solution and/or dispersion, and the sheets or slabs to be bonded together are subjected to heat and pressure to effect in situ the setting or further condensation of the resin. Alternatively, particulate ligno-cellulosic material may be wetted with a solution of the particular resinous material that is to be used while it is in the form of a relatively low molecular weight condensate and the wetted particles are then molded into desired shapes such as slabs, blocks or the like, the molding being under the influence of heat and pressure which consolidates the mass and effects the thermosetting of the resin employed.

For the purpose of accelerating the setting of the resin, so-called hardening agents may be added, such hardening means usually being in the form of salts. These hardening agents merely act on the thermosetting resin and accelerate its further condensation under the influence of heat and/or pressure into products which are not soluble in water and otherwise are more effective as a binder. In the manufacture of such products the resulting properties depend essentially on the adhesive strength of the thermosetting resin and there is little or no interaction of a chemical nature between the thermosetting resin and the ligno-cellulose material.

I have discovered that by utilizing small additions of the activator having an anionic radical selected from fluoride and bifluoride, and a cationic radical selected from hydrogen, an alkali metal, ammonium and iodine, the iodine being associated only with the fluoride as iodine pentafluoride, in the combination of a thermosetting resin with a ligno-cellulosic material and subjecting the combination to the influence of heat and pressure results in a product having markedly superior characteristics than those prepared without the use of the activator. The activator is employed in amounts of about 0.01 to 0.5% by weight, based on the resin, although lower or higher amounts may be used with less satisfactory results. Specific examples of the activator are hydrogen fluoride, ammonium bifluoride ($NH_4HF_2$), potassium bifluoride ($KHF_2$), iodine pentafluoride ($IF_5$), sodium fluoride ($Na_2F_2$), natrium bifluoride ($NaHF_2$).

The activator serves to accelerate or initiate chemical union between the thermosetting resin and the ligno-cellulosic material. The role of the activator is distinguished from conventional hardeners. Hardeners act to accelerate the condensation reaction of the resin only, as evidenced by hardening of the resin without a consequent effect on the mechanical properties of the cellulose-resin product. Activation by the adjuvant of the present invention creates a chemical union between the ligno-cellulosic material and the thermosetting resin. This fact has been surmised from experimental evidence. For example, potassium hydrogen fluoride was added to an alcoholic solution of urea-formaldehyde resin and maintained at 100° C. for 24 hours. At the end of the experiment the product was spongy, indicating that the fluoride was not a hardener. On the other hand, ammonium chloride, a known hardener, when added to the same kind of resin and held at 85° C., within a relatively shorter period of time resulted in a hard and infusible resin. In another set of experiments, the hardener and the activator were added separately to a mixture of urea-formaldehyde resin and wood chips (ligno-cellulosic material), and each mixture was subjected to heat and pressure. The mixture containing the activator resulted in a product of significantly superior mechanical properties than the product obtained from the use of the hardening agent. In similar experiments the mixtures were subjected to heat without pressure. A solid product was obtained from the mixture containing the hardening agent, although it was inferior to the one obtained in the experiment involving the additional use of pressure. In the case of the mixture containing the activator, it was not evident that any reaction took place. Also of significance is that the use of my activator with a mixture of cellulose and a thermosetting resin gave no improvement over a similar mixture without the activator. A ligno-cellulosic material is needed and not cellulose per se. With respect to the resin, in another experiment, polyvinyl vinyl acetate was employed in place of a thermosetting resin. No improvement or evidence of reaction between the plastic (a non-thermosetting type) and the activator could be detected. It can be surmised that a thermosetting resin, or one which can react further through condensation or equivalent reaction is needed for the present invention and that the other material, the ligno-cellulose, couples with it through the agency of the activator.

The conditions under which the ligno-cellulose and thermosetting resin are united through the activator are similar to those employed in conventional procedures without the activator. The temperature of reaction is above ambient level, although usually a temperature of about 90° to 200° C. is employed. A superatmospheric pressure is employed, apparently to bring together the ligno-cellulose and the resin for reaction. A pressure of about 30 to 300 p.s.i. may be used, and the pressure may range up to about 4500 p.s.i.

The ligno-cellulosic material is derived from the same materials as described hereinabove for conventional processes. Shavings, chips, sawdust, wood cuttings, wood sheets or slabs or the like can be fabricated into useful products of greater value than the starting material. The ligno-cellulose is mixed with the resin in the form of an aqueous or alcoholic solution or dispersion. For wood boards, about 4 to 10% by weight of resin on a total dry weight basis is employed, whereas for plywood about 40 to 60 pounds of resin per 1000 sq. ft. of wood surface are used. The resin is preferably of low molecular weight so that upon being subjected to reaction conditions further condensation occurs. Many thermosetting resins are either water or alcohol soluble at relatively low molecular weights, but upon being further condensated, the resins may lose their solubility in such solvents. It is not required that the resins be water or alcohol soluble for my invention, they need only be capable of further condensation into products of higher molecular weight. In this way it is evident that the resin has reactive centers for union with the lignocellulosic material. The resins should be capable of further reaction when subjected to heat as contrasted with non-setting polymers or polyvinyl acetate. Illustrative resins are ureaformaldehyde, dicyanamide-formaldehyde, phenol-formaldehyde, melamine-formaldehyde, etc.

By the use of my activator substantial improvements may be effected in the product as regards useful properties of the type which are measured by tensile strength, bending strength, shear strength and the like. Alternatively, substantially less of the thermosetting resin may be employed while obtaining properties which are comparable to those which are obtained using larger quantities of resin, but in the absence of the activator. In this way very substantial savings may be effected in the cost of the components of the ligno-cellulose product without sacrifice in properties. The quantity of the activator may be very small. Thus ordinarily the activator constitutes only about 1/4000 of the weight of the final product.

The improvements which are made possible according to this invention are illustrated in connection with the examples given hereinbelow. Where values for thickness swell are mentioned, such values provide a quick indication as to the transverse stress strength of the product tested, such as a board or panel.

Example 1

Wood shavings were wetted with an equeous solution of urea-formaldehyde resin, the solution containing about 50% by weight of the resin solids. The wetted shavings were formed into a board by being conventionally subjected to heat and pressure to effect consolidation of the wetted shavings and thermosetting of the resin. Upon immersion in water for 24 hours the board exhibited an increase in thickness due to swelling of 8.5%. The same procedure was followed except for a decrease of 16% in the resin content of the solution, the volume of solution used being the same; and in this case the increased thickness due to swelling was 14.1% under the same test conditions, namely, a 65% decrease in resistance to swelling.

The foregoing procedure was again repeated using the solution containing the resin content lowered by 16%, but in this case there was added to the resin solution 0.24%, relative to the solid resin content, of ammonium bifluoride $NH_4HF_2$. In this instance the increase in thickness due to swelling when tested as aforesaid was 7.5%, thus showing an improved resistance to swelling notwithstanding a 16% decrease in the solid resin content of the board.

Example 2

Board material was manufactured in a conventional commercial operation utilizing wood shavings and an adhesive liquor containing 43.8% of solid resin in the form of a urea-formaldehyde resin, the wetted shavings being molded under heat and pressure. The commercial operation was repeated except that there was added to the adhesive liquor 0.19% of $NH_4HF_2$ and 0.063% of $KHF_2$, each being relative to the solid resin content and except that the solid resin content was 20% less than the resin content used in the runs without the additives mentioned. The resulting boards had essentially the same specific weight, but the board made with the adhesive liquor containing the aforesaid activators exhibited a 37% increase in bending strength and a 41% increase in transverse-stress strength, in comparison with boards made without the utilization of these activators and containing 20% more of resin solids. The resistance to swelling upon water immersion and water absorption were about the same in each instance.

Example 3

A molded body was produced by molding under heat and pressure a mixture of powdered ligno-cellulose material and a phenol-formaldehyde granular material in the partially condensed state. The same procedures were followed (a) utilizing the resin without the activator and (b) resin to which there had been added between 1% and 2% of a 6% solution of a mixture of $NH_4HF_2$ and $KHF_2$ in the ratio of 3:1. Notched test bars made utilizing the activator exhibited an increase in impact strength between 20% and 25% and about a 10% increase in bending strength was obtained.

Example 4

In conventional commercial manufacture of board material wherein wood particles wetted with partially condensed phenol-formaldehyde or urea-formaldehyde resin were molded under heat and pressure, the addition to the resin of 5% of a 5% solution of a mixture of $NH_4HF_2$ and $KHF_2$, calculated on the dry weight of the resin employed, resulted in an increase in tensile strength of about 25% to 30%. When a like proportion of the activators relative to the resin was employed, but the total resin was reduced by 20%, an increase in tensile strength of 10% was obtained as compared with the conventionally produced board containing the greater quantity of resin, and there also was an increase in bending strength and increased resistance to swelling.

Example 5

The manufacture of plywood was carried out so that normal output calculated on 1000 grams of thermosetting urea-formaldehyde resin was 5.3 sq. meters, the plywood being subjected to conventional heat and pressure for effecting its consolidation and the setting of the resin. The manufacture of the plywood was repeated except that there was added to the bonding solution employed 5% of a 5% mixture of $NH_4HF_2$ and $KHF_2$ calculated on the dry resin content and except that the resin content was applied so as to obtain 8.2 sq. meters per 1000 grams of resin. Notwithstanding the greater production of plywood relative to the amount of resin employed, the bond strength was substantially the same.

Example 6

The manufacture of plywood as described above in connection with Example 5 was repeated except that 5% of a 5% solution of the same salts was added to a 50% phenol-formaldehyde resin, the amount being calculated on the 50% phenolics content in the resins rather than the dry resin based. The plywood obtained exhibited greatly increased strength under the resin-veneer (wood failure test) and highly increased resistance to the action of boiling water as compared with plywood similarly manufactured without utilization of the added salts.

In each of the foregoing examples the activators are present during the setting of the thermosetting resin. It is believed that the improvements which are made possible according to this invention result from the generation of secondary valence forces which are released or developed in the ligno-cellulose material (which may involve the lignin or the hemi-celluloses or both) while corresponding phenomena occur during the setting of the thermosetting resin. The secondary valences are believed to effect a bond or interaction between the ligno-cellulose material and the activated intermediate groups and end groups of the condensing resin. It is believed, therefore, that the activators effect an interaction of a chemical or quasi-chemical nature between the ligno-cellulose material and the condensing synthetic resin, such interaction being made possible or induced by the activators and the interaction thereby affording providing chemical union of the substances present as distinguished from mere adhesion. The phenomena occurring are regarded as distinguished from the inclusion of substances which are in the category of "hardeners" inasmuch as known hardeners require the presence of a 6% to 7% addition thereof to the adhesive liquor as compared with an addition to the adhesive liquor of only about 0.2% to 0.3% of the aforementioned activators. Moreover, even if the added hardener is increased or decreased in magnitudes of the order of 50% or 100% no influence on physical properties obtained in the finished product can be obtained such as that which occurs from the use of the aforementioned activators.

The activator that is employed in the practice of this invention may be caused to be present in various ways. Usually the more convenient practice is to incorporate the activator in a solution or dispersion of one or more of the substances to be bonded, e.g., to incorporate it in an aqueous solution or dispersion of the partially condensed thermosetting resin. Alternatively, the activator may be made up in the form of a solution and the solution may be used to wet pieces or particles of material that enter into the bonding reaction. For example, when a thermosetting resin is employed in solid, finely divided particulate form, the particles may be wetted with such a solution. Alternatively, the surfaces of solid pieces to be bonded may be wetted with a solution containing the additive. The activator may likewise be caused to be present in finely divided solid condition, but inasmuch as the additives employed in the practice of this invention exercise their action with optimum effectiveness when employed in very minute amounts, it is not as easy, when the additive used is in solid form, to obtain its effective distribution among the other substances present. For the bonding pieces of ligno-cellulose such as particles, sheets, slabs and the like, it usually is desirable to employ a 50% to 65% aqueous or alcoholic (methanol) solution of the particular thermosetting resin employed and add thereto about 0.01% to 0.5% of the activator.

I claim:

1. In a method of bonding together pieces of ligno-cellulose material by means of a thermosetting resin which sets in situ under the influence of heat and pressure, the step of creating the bond between said pieces of ligno-cellulose material by the inclusion in the zone wherein said bonding is effected of about 0.01% to about 0.5% by weight, based on the weight of said resin, of an activator having an anionic radical selected from the group consisting of fluoride, and bifluoride and a cationic radical selected from the group consisting of hydrogen, iodine, an alkali metal and ammonium, the iodine being associated with the fluoride and effecting the setting of the resin in situ in the presence of said activator.

2. An article of manufacture comprising pieces of ligno-cellulose material bonded to each other by a thermosetting resin set in situ in the presence of about 0.01% to about 0.5% by weight, based on the weight of said resin, of a bifluoride substance containing at least one cationic radical of ammonium and of alkali metal.

3. An article of manufacture according to claim 2 wherein said bifluoride substance constitutes less than 2/1000 by weight of said article of manufacture.

4. The method of claim 1 wherein the activator is a bifluoride substance containing at least one cationic radical of ammonium and of an alkali metal.

5. In a method of bonding together pieces of ligno-cellulose material by means of a thermosetting resin which sets in situ under the influence of heat and pressure, the steps comprising preparing an aqueous solution of a fluoride selected from the group consisting of fluorides having an anionic radical selected from the group consisting of fluoride and bifluoride and a cationic radical selected from the group consisting of hydrogen, iodine, an alkali metal and ammonium, the iodine being associated with the fluoride, adding an amount of said solution to said resin such that said fluoride contained therein constitutes from about 0.01% to about 0.5% based on the weight of said resin, and effecting the setting of said resin in situ in the presence of said fluoride.

6. A method according to claim 5 wherein said solution of said fluoride is commingled with a partially condensed thermosetting resin contained in an aqueous medium.

7. A method according to claim 5 wherein said thermosetting resin is a resin selected from the group consisting of urea-formaldehyde, dicyanamide-formaldehyde, phenol-formaldehyde and melamine-formaldehyde, and wherein said fluoride consists predominantly of ammonium bifluoride.

References Cited in the file of this patent

UNITED STATES PATENTS

| | | |
|---|---|---|
| 1,851,953 | Dike | Mar. 29, 1932 |
| 2,413,624 | Harris | Dec. 31, 1946 |
| 2,489,145 | Lieb et al. | Nov. 22, 1949 |
| 2,809,181 | Turner et al. | Oct. 8, 1957 |